H. LENTZ.
GAS TURBINE ENGINE.
APPLICATION FILED MAR. 31, 1905.

911,825.

Patented Feb. 9, 1909.

WITNESSES;
John H Hoving
F H Logan

INVENTOR,
HUGO LENTZ,
BY
Attorney

UNITED STATES PATENT OFFICE.

HUGO LENTZ, OF BERLIN, GERMANY.

GAS TURBINE-ENGINE.

No. 911,825.   Specification of Letters Patent.   Patented Feb. 9, 1909.

Application filed March 31, 1905. Serial No. 253,106.

*To all whom it may concern:*

Be it known that I, HUGO LENTZ, subject of the German Emperor, residing at 10–11 Potsdamerstrasse, Berlin, Germany, engineer, have invented a new and useful Improvement in Gas Turbine-Engines; and I do hereby declare the following to be a full, clear, and exact description of the same.

This invention relates to turbine-engines operated by explosions of gas mixed with air or other medium, and the special object thereof is to combine in one entity or machine two turbine wheels running in opposite directions and a compressor operated by one of said turbines and which is employed to compress the air supplied with the gas ignited to drive the two turbine wheels.

Prior to my present invention, gas turbine-engines, as well as piston engines operated by gas-explosions, have usually been provided with an auxiliary compressor-mechanism for the purpose of compressing the air, gas, or other medium before ignition of the charge. In contradistinction to said structures, my invention comprises means whereby the compressor-mechanism forms a part of the turbine-engine itself, and is so arranged with respect to the main shaft, or shaft giving the principal working effect, and connections, that the compressor-mechanism will be operated by the pressure-medium after it has acted upon the turbine-wheel or turbine-wheels connected with said main shaft. It will thus be seen that I utilize the pressure-medium, after its use for power purposes, as the means for effecting the compression of air or gas or both, and, the air or gas so compressed is utilized, when ignited or combined with the ignited charge, to drive the same turbine-engine with which the compressor-mechanism is combined.

In the carrying out of my invention, I employ not only the turbine-wheels which drive the power-shaft, but also a supplementary or additional turbine-wheel, driven by the pressure-medium, after leaving the main turbine-wheel or turbine-wheels, and also connected compressor-mechanism. The form employed by me, viz., having two shafts running in opposite directions, may be like that utilized in the Seger turbine (see, for instance, pages 225–227, of Lowenstein's translation of the second edition of "Steam Turbines", by Stodola), the two turbine-wheels being, however, employed by me to operate two different mechanisms.

It is, of course, within the scope of my invention to secure a plurality of rotating wheels, which may be spaced apart by suitable guide-wheel systems (as in the Curtis type), upon either or both of the oppositely-rotating shafts.

Figure 1:
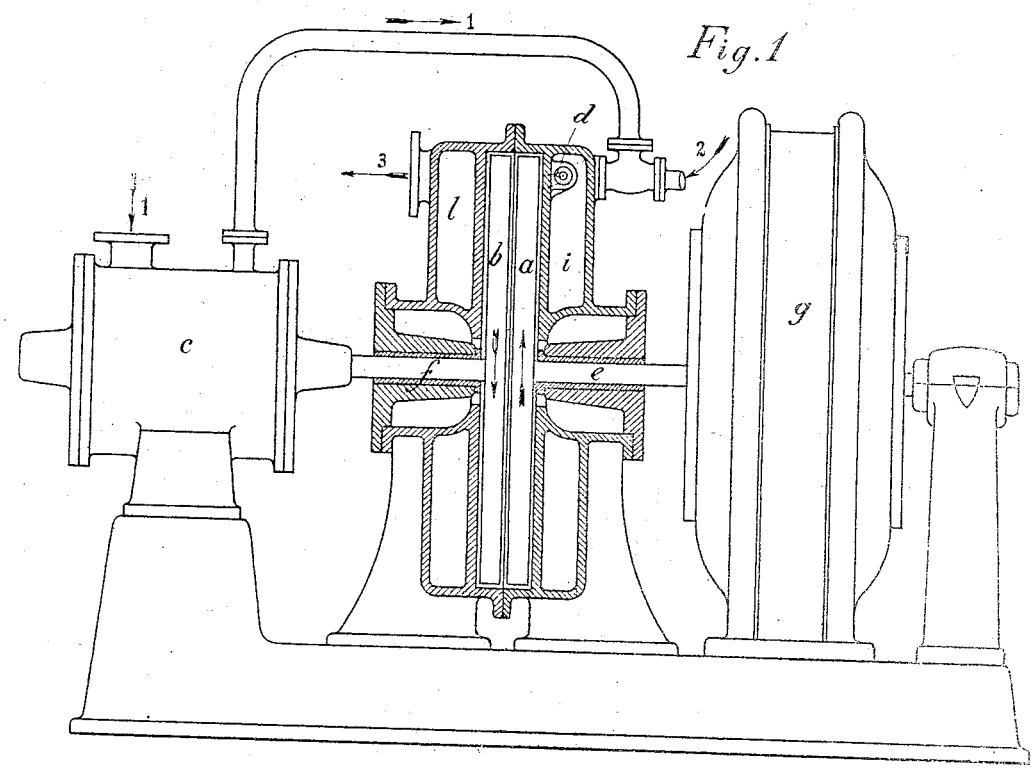
Figure 2:
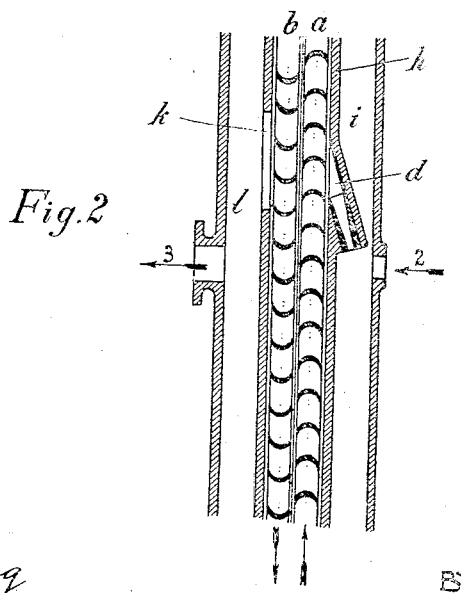

Referring to the accompanying drawings, Figure 1 is a side view, showing a dynamo and a compressor and, between these, a turbine-engine having oppositely rotating turbine-wheels; and Fig. 2 is a view showing the relative arrangement of said wheels and the nozzle for supplying pressure-medium thereto.

$a$ is the primary wheel, *i. e.*, the wheel of greater power effect, $b$ is the secondary wheel, *i. e.*, the wheel of smaller power effect; $d$ represents a nozzle, of which there may be any number, for directing the pressure-medium against the blades of wheel $a$; $c$ represents a compressor, which may be of any suitable construction, and comprising a shaft, $f$, driven by the wheel $b$; $g$ represents a suitable machine, a dynamo being shown as directly connected with a shaft, $e$, driven by the wheel $a$. Any other suitable form of machine, and driven directly, or by a belt, rope, or otherwise, may be used instead of the dynamo.

The blades of the wheels $a$ and $b$ are oppositely arranged, and, as a result, said wheels will tend to be driven in opposite directions, as indicated by the arrows in Fig. 2.

I have shown the compressor-mechanism connected with the wheel $b$, and have shown a dynamo connected with the wheel $a$. The compressor may compress the gas, or the air, or both, and the compressed medium is led off, for effecting the operation of the wheel or wheels $a$; for instance, the compressed air may be led, by suitable regulating devices, into an ante-chamber near the wheel $a$, and upon ignition of the gas the air will be expanded and expelled through the nozzle, $d$, directing it against the blades of wheel $a$, which in turn deflect the pressure-medium against the oppositely - arranged blades of wheel $b$.

It is obvious that, in my improved turbine-engine, the compressor - mechanism, corresponding to the auxiliary engine usually employed, forms a practical unit with the turbine; also that the working action takes place at one side only, as distinguished from the Riedler-Stumpf turbine (described in Riedler's lecture on steam-turbines, and illustrated in Fig. 41, page 56, of the published account thereof) which operates dynamos giving an even effect on both sides, and from the Seger turbine (described and shown in the Lowenstein translation, hereinbefore mentioned, at pages 225-227) wherein a single working shaft is connected, by a single belt with different sizes of pulleys on both turbine-shafts.

The work of compression of air and gas can be carried on separately or simultaneously. In considering the apparatus of Fig. 1, it is assumed, for simplicity, that the air and gas are compressed by $c$ simultaneously, and that the compressed mixture passes from thence to the combustion-chamber, and from the latter to the turbine proper. However, the air and fuel, which latter may be in liquid or atomized form, and may be injected into the combustion chamber, may be conveyed in any desired manner, irrespective of the manner of or devices for effecting combustion.

What I claim is:

1. A motor comprising a primary turbine-wheel and a secondary turbine-wheel within the same casing and arranged to be driven independently and in opposite directions by pressure-medium, a combustion-chamber, a nozzle leading from said chamber for supplying pressure-medium to the wheels, a machine shaft connected to the primary turbine-wheel, a machine shaft driven independently of that first-named and connected to the secondary turbine-wheel, a compressor-mechanism operated by the second-named shaft, and connections for leading compressed air from said compressor to the combustion-chamber aforesaid.

2. A motor comprising a primary turbine-wheel and a secondary turbine-wheel within the same casing and arranged to be driven independently and in opposite directions by pressure-medium, a combustion-chamber formed in said casing, a nozzle leading from said chamber for supplying pressure-medium to the primary turbine-wheel, a machine shaft connected to the primary turbine-wheel, and a machine shaft driven independently of that first-named and connected to the secondary turbine-wheel.

In testimony whereof, I have signed my name to this specification in the presence of two subscribing witnesses.

HUGO LENTZ.

Witnesses:
KARL H. MERK,
LUDWIG LICHTENSTEINER.